United States Patent

[11] 3,578,918

[72] Inventors Pierre M. Lucas
20 rue Tariel, Issy-Les-Moulineaux;
Jean F. Duquesne, 120 rue de Javel; Jean-pierre L. Berger, 124 boulevard Auguste Blanqui, Paris; Roger L. Courtois, 65 avenue Paul Vailant-Couturier, Gentilly, France

[21] Appl. No. 848,063
[22] Filed Aug. 6, 1969
[45] Patented May 18, 1971
[32] Priority Aug. 8, 1968
[33] France
[31] P.V.162,411

[54] COMPUTER CONTROLLED SWITCHING SYSTEM USING FLIP-FLOPS FOR CONTROL OF REPETITIVE OPERATIONS
2 Claims, 14 Drawing Figs.

[52] U.S. Cl. .......... 179/18ES
[51] Int. Cl. .......... H04q 3/54
[50] Field of Search .......... 179/18 (ES)

*Primary Examiner*—William C. Cooper
*Assistant Examiner*—Thomas W. Brown
*Attorney*—Abraham A. Saffitz

ABSTRACT: Digital computer for controlling telephone switching systems. The computer can be controlled selectively by two control circuits: a program permanent store and a group of flip-flops. The program permanent store has written therein contingent instructions relative to telephone communication establishment and release processing operations and is associated with a readout instruction register, an instruction address register and an auxiliary instruction address register. A multiregister has written therein register words containing data relative to the actual state of a telephone communication being processed, and this multiregister is associated with a readout register and a write-in register. The group of flip-flops controls repetitive operations, such as reading out from the readout register the register words, testing the potentials of points located in said switching system and rewriting in the write-in register the register words selectively modified according to the test results. A first means and a second means for jumping from the control of the computer by said group of flip-flops to the control thereof by said program permanent store and vice versa are provided. The first means comprises means for comparing the results of two consecutive potential tests, means for counting the number of consecutive tests with unchanged results and means, controlled by both said comparing means and said counting means, for inhibiting said flip-flops, transferring in the instruction address register the address contained in the auxiliary instruction address register and activating the program permanent store. The second means comprises means for detecting a jump instruction in the readout instruction register, transferring in the auxiliary instruction address register the address of the jump instruction, inhibiting the program permanent store and activating the group of flip-flops.

INVENTORS:

P. M. LUCAS, J. F. DUQUESNE,
J. L. BERGER, R. L. COURTOIS
By: Abraham A. Saffitz INVENTORS:
P. M. LUCAS, J. F. DUQUESNE,
J. L. BERGER, R. L. COURTOIS
By: Abraham A. Saffitz
ATTORNEY (1) ACCORDING TO CONDITION "D"

(2) ACCORDING TO THE BIT OF HIGHER WEIGHT OF THE SLOW PHASE (*) IF SP TEST IS POSITIVE (SP=1)

INVENTORS:
P. M. LUCAS, J. F. DUQUESNE,
J. L. BERGER, R. L. COURTOIS
By: Abraham A. Saffitz
ATTORNEY

INVENTORS:

P. M. LUCAS, J. F. DUQUESNE,
J. L. BERGER, R. L. COURTOIS

By: *Abraham A. Saffitz*
ATTORNEY

INVENTORS:
P. M. LUCAS, J. F. DUQUESNE,
J. L. BERGER, R. L. COURTOIS
By: Abraham A. Saffitz
ATTORNEY

INVENTORS:

P. M. LUCAS, J. F. DUQUESNE,
J. L. BERGER, R. L. COURTOIS

By: Abraham A. Saffitz
ATTORNEY

Patented May 18, 1971 3,578,918

7 Sheets-Sheet 7

INVENTORS:

P. M. LUCAS, J. F. DUQUESNE,
J. L. BERGER, R. L. COURTOIS

By: Abraham A. Saffitz
ATTORNEY

COMPUTER CONTROLLED SWITCHING SYSTEM USING FLIP-FLOPS FOR CONTROL OF REPETITIVE OPERATIONS

The invention relates to computers earmarked for tasks of which a definite proportion is of very repetitive nature and must be performed in actual elapsed time, and whose other tasks correspond to a program recorded in a program permanent store, varying in nature according to the application contemplated. Such specialized computers are found, for example, in electronically controlled automatic telephone switching systems.

The principal object of the invention is a computer specialized for telephone switching systems employing two alternate methods of operation, that is to say whereof the elementary control instructions or orders may be drawn alternately from two sources:

1. a source of stored instructions. A set of orders referred to as instructions, is extracted sequentially from a program permanent store, after which the orders composing each of these instructions are carried out consecutively.

2. Nonstored instructions are defined by particular conditions determined by the state of monitoring flip-flops and the corresponding operations are triggered by the activation of the outputs of particular flip-flops according to a predetermined temporal scheme. Such a sequence of operations is referred to as a fundamental instruction. The program permanent store is then no longer employed to provide instructions linked or sequenced according to the techniques of the recorded program, but to prepare the eventual changeover from the second modality (nonstored fundamental instructions or monitoring program) to the first (instructions of the programmed sequences).

This structure combines the efficiency of a cabled monitoring program (the fundamental instruction devised to correspond to the specific problem of high-speed "management" in real time) with the flexibility of the subprograms recorded in modifiable storage units (the directives are determined by the programming unit to correspond to the diversified requirements of the operation).

The computer according to the invention employs a fundamental structure common to both modalities of operation, in particular:

—the same time base,

—the same program permanent store employed in the first modality to read out the successive instructions, and in the second modality to read, in a "table of phases," the addresses for eventual transition to the "phase subprograms," that is to say to establish the eventual transition from the second modality to the first, —the same code of elementary operations, —the same priority interruption mechanism (insertion of a sequence of instructions forming an "interruption subprogram" between two instructions of the first modality or two fundamental instructions of the second modality), this interruption following a call made by a peripheral element.

The following will be examined in turn in the statement which follows, based on general information on telephone programs (I):

II The structure of the computer common to the two "programmed or stored" and "cabled or nonstored" modalities.

III The linking of the instructions in the programmed modality (make-up and format of the instructions, calculation of the address of the consecutive instruction).

IV The make-up of the fundamental instructions.

V The interlinking between the fundamental instructions.

VI The transition between the second modality and the first (embarking on a phase subprogram), this transition applying a conventional mechanism (the same as that for extraction of the instructions). VII The transition between the first modality and the second during a programmed sequence (the return to fundamental instructions after a phase subprogram).

VIII The mechanism for priority interruption of the instructions and of the fundamental instructions.

IX The interruption subprograms and in particular the make-up of these subprograms which allows these to be inserted into a programmed sequence (severable instructions) or into a sequence of fundamental instructions without affecting the subsequent evolution of these sequences (restrictions on the method of interruption).

The disclosure will be carried out with reference to the accompanying drawings, in which:

FIG. 1 is a block diagram of the computer of the invention;

FIGS. 2*a*, 2*b*, 2*c* and 2*d* show the formats of the different types of programmed instructions;

FIG. 3 shows the timing, the orders and the corresponding operations relative to a programmed instruction;

FIGS. 4*a*, 4*b* and 4*c* show the timing and the operations relative to the three fundamental instructions;

I—FUNCTION OF THE FUNDAMENTAL INSTRUCTIONS AND OF THE PHASE SUBPROGRAMS

Figure 1:
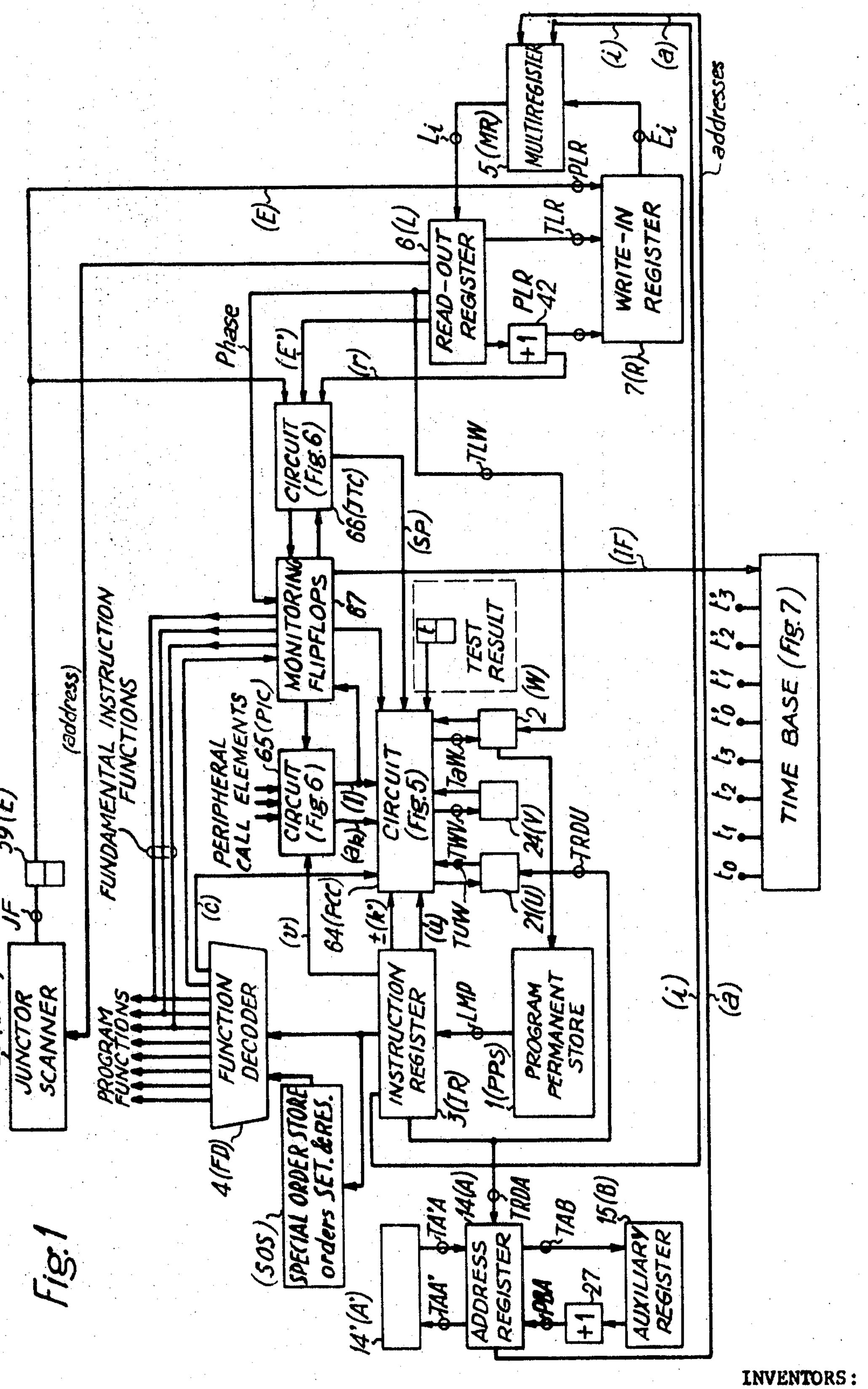

I,1—Prior art:

U.S. Pat. No. 3,497,630, issued Feb. 24, 1970, disclosed telephone calculators incorporating a recorded program, possessing a permanent program memory or storage unit from which elementary instructions are extracted in sets of three orders forming a directive. Each of these three orders $0_1$, $0_2$ and $0_3$ is then carried out in its turn, after which the address of the following directive is calculated and serves the purpose of directing the address register associated to the program memory.

These telephone calculators also employ fundamental directives which perform the most repetitive switching operations in a minimum of time (successive examination and correlative modification of register-words forming a multiregister combined with tests on the line junctors monitored by these register-words) and which, as a function of the cases encountered during this repetitive subprogram can jump to an appropriate "phase subprogram" whilst making allowance for the different possibilities of interruption by peripheral elements.

These fundamental directives are not essentially different from the normal directives however. In particular, they must be drawn from the program memory every time it is mandatory to carry these out, causing a useless waste of time since these fundamental directives are very frequently called upon during the normal evolution of a telephone program.

On the contrary, according to the invention, the fundamental instructions are not drawn from the program memory, being characterized by the operating state of particular flip-flops referred to as monitor flip-flops. Accordingly, no time is wasted in extracting these from a memory unit.

Fundamental instructions of three types referred to as $IF_0$, $IF_1$ and RD, are considered in the telephone application example selected. Their purpose is to effect the processing as quickly as possible and in actual time, of the data contained in the register-words, and their modification according to the momentary state of the supervised or tested points.

A definite portion of a temporary memory unit referred to as a multiregister registering the data relating to a telephone call in process of being established or disconnected, is referred to as a register-word. The register-words are respectively associated to the subscriber's line junctors involved in the calls via a junctor scanner. This scanner detects the signals appearing at predetermined points in the junctors (for example: detection of loop interruptions by the dial). Analogously, the signalling circuits (signalling sender or receiver for example)

involved temporarily in the calls are scanned by appropriate scanners.

The addresses which render it possible to direct the scanner to the appropriate test points are registered among the data contained in the register-word. From the instant at which these addresses have been registered, a very substantial part of the function of the multiregister will consist in periodically directing the scanner to the point or points to be scanned, in recognizing the state variations of these points and in effecting the corresponding modification of the content of definite data recorded in the register word concerned and which indicate the progression of the signals received.

Given the relative paucity of the signals to be detected during the time in which a register-word is allocated to a particular call, a substantial proportion of periodical tests will yield an insignificant result. Those yielding a positive result (corresponding to a change in the signal sequence) should be followed as a rule by a sequence of analogical operations which are complex and vary considerably according to the circumstances encountered. It is of importance therefore, to waste as little time as possible on the "negative" tests, whilst retaining optimum flexibility in the processing of data following a "positive" test.

I,2—Rapid recurrence fundamental instructions $IF_0$, $IF_1$

The fundamental instructions relate to the rapid periodical examination of the register-words and to the directing of the scanner to an appropriate test point.

Each register-word is arranged to perform the rapid rate monitoring of two independent lines (that of a calling subscriber and that of a called subscriber for example, or the line of a called subscriber and a signalling sender coordinated with an outgoing circuit or else the line of a called subscriber and a signalling receiver coordinated with an incoming circuit). Accordingly, two independent sets of periodical signal test operations should be available for each register-word. These correspond to two so-called rapid recurrence fundamental instructions $IF_0$ and $IF_1$ which are carried out consecutively by one and the same register-word. The first fundamental instructions $IF_0$ is always performed, but is not followed by $IF_1$ unless this is necessary, which is specified by a "phase" information registered in the register-word.

A short programmed routine is triggered when the tests made during $IF_0$ or $IF_1$, have yielded a positive result. This routine is referred to a "phase subprogram" and its content depends essentially on the momentarily prevailing value of the "phase" information. After being performed, the phase subprogram leads back as a rule to the fundamental instructions of the same register-word or of the following register-word.

I,3—Slow recurrence fundamental instructions RD

The data processing operation to be undertaken may be too voluminous however to be performed entirely within the short period of the phase subprogram. In this case, this processing operation is relegated to another instant of the program referred to as "slow-recurrence register-word processing." In this other portion of the program, the same register-words are each analyzed in turn and a series of linked elementary operations is produced according to the momentarily prevailing value of a so-called "slow phase" datum registered in the register-word.

Accordingly, if the rapid recurrence phase subprogram cannot perform the operation as a whole, it contents itself with modifying the value of the slow phase datum in such manner that when the register-word is examined by the slow-recurrence program, this may delegate the task to a slow-recurrence phase subprogram which, as a rule, will perform the appropriate data processing operation. If the slow-recurrence program cannot complete the operation as a whole, it will modify the value of the slow phase datum so that the continuation of the operations may be performed during the next cycle of the slow-recurrence program.

The instruction RD is the third fundamental instruction which, together with $IF_0$ and $IF_1$, is a nonstored instruction.

I,4—To summarize, the fundamental instructions applying to a register-word may be one of the three following kinds:

$IF_0$ = test by the scanner under rapid recurrence, of a first signal test point.

$IF_1$ = test by the scanner under rapid recurrence, of a second signal test point.

RD = examination of the "slow-phase," under slow recurrence.

After a fundamental instruction has been performed, if definite conditions are fulfilled (variation of state or existence of a slow phase not equal to nought) the application of the phase subprogram specified by the value of the phase (rapid or slow as the case may be) is undertaken. If these conditions are not fulfilled, another fundamental instruction is carried out, which as the case may be:

—after $IF_0$, is the fundamental instruction $IF_1$ for the same register-word if appropriate, or else the fundamental instruction $IF_0$ for the following register-word;

—after $IF_1$, the fundamental instruction $IF_0$ for the following register-word;

—after RD, the fundamental instruction RD for the following register-word.

In the structure of the computer, the fundamental instructions are characterized by particular flip-flops: IF, IFA and IFB referred to as monitoring flip-flops, according to the following code:

IF = 0 characterizes the programmed sequences (operation according to the first modality)

IF = 1 characterizes the fundamental instructions (operation according to the second modality)

IF = 1, IFA = O, IFB = O characterizes the instruction of the type $IF_0$

IF = 1, IFA = 1, IFB = O characterizes the instruction of the type $IF_1$

IF = 1, IFA = O, IFB = 1 characterizes the instruction of the type RD.

II—STRUCTURE OF THE COMPUTER—FIG. 1

The computer comprises the following elements:

—a program permanent store 1 coordinated with an instruction address register 2 and an instruction register 3; this instruction register comprises an auxiliary address register 30 referred to as address increment register;

—an instruction address computer which, apart from the instruction address register 2, comprises a prestore register 24, a transfer address register 21 and an adding-substracting unit 23;

—a function decoder 4 connected to the output terminals of the instruction register 3 and whose outputs actuate function "gates" distributed in the computer;

—a multiregister 5 with its address register 14, its readout register 6 and its write-in register 7;

—a junctor scanner 26 which is directed to the particular point tested according to the contents of a part of the readout register 6 of the multiregister 5.

All these elements already incorporated in the computer of the aforesaid U.S. application and bore the same reference numerals.

Complementarily, the computer according to the invention comprises:

—monitoring flip-flops 61 (IF), 62 (IFA), 63 (IFB) characterizing the fundamental instructions;

—a progression control circuit 64 (PCC) which allows the calculated address of the following instruction to be inserted in the instruction address register 2;

—a priority interruption circuit 65 (PIC) providing the choice between simultaneous demands for interruption and return to the appropriate interruption subprogram;

—a jump test circuit 66 (JTC) to test for the need to pass from a fundamental instruction to a phase subprogram;

—a time base distributing timing pulses to all the circuits.

III—CHAINING-UP OF THE INSTRUCTIONS IN THE PROGRAMMED MODALITY

III,1—Format of the instructions

In the programmed modality, the directives are read out successively in the program permanent store 1 in the form of words having 32 bits. These words comprise from one to three coded orders of 10 bits each and 2 particular bits $u$ and $v$ ($u$ determines the type of address progression, and $v$ the quality of "interruptibility" as will be set forth in paragraph VIII,1).

Four formats of instructions are possible:

1. Instructions consisting of a conditional order (FIG. 2$a$) 10 bits define the code of the single order $0_1$, 10 bits define the address increment ($\pm v'$), the other 10 bits not being in use as a rule. $u$ and $v$ complete the instruction. The conditional order entrains a signal test of optional nature; if this test is positive, it causes a sequence interruption at a transfer address, that is to say that the address of the actual instruction has added to it the value $\pm v'$ specified in this instruction to find the address of the future instruction. If, on the contrary, the test is negative, two cases must be considered, depending on the value of the binary digit $u$ in the instruction.

If $u$=0, the address of the following instruction is obtained by adding +1 to the address of the actual instruction.

If $u$=1, address of the following instruction is taken from the transfer address register 21. A sequence interruption is thus obtained at a noncorrelated address (since the content of the instruction address register 2 of the program permanent store 1 is replaced entirely by the content of the transfer address register 21).

2. Instruction consisting of two orders and one address increment 10 bits define a first order $0_1$, the 10 following bits define a second order carried out following the first, 10 bits define an address increment $\pm v'$ The bit $u$ is always equal to 1.

3. Instruction consisting of three orders.

The three sets of 10 bits define the three orders $0_1$, $0_2$, $0_3$ which are carried out one after another at three consecutive active periods $t_1$, $t_2$, $t_3$. The binary digit $u$ is always equal to nought. The instruction address progression method is the following in these last two formats:

The instructions are not conditional, but the address progression depends on the value of the binary digit $u$ in the following manner:

—if $u$=0, the address of the following instruction is obtained by adding +1 to the address of the instruction being implemented.

—if $u$=1, the following address is obtained by adding to the address of the instruction being implemented the value $\pm v'$ of the address increment included in the instruction.

4. Instructions having a special function.

Ten bits define a special order $0_1$; 4 bits define a first parameter $i$, 9 or 10 bits define a second parameter $\alpha$. $i$ and $\alpha$ jointly define the address of a register-word in the multiregister 5.

Contrary to three preceding cases, the order $0_1$ is valid not only during the initial period, but for the three active periods. It is thus decoded during the three active periods and controls a set of operations which will be described in paragraphs IX,1 and IX,3.

III,2 =Calculation of the address of the next instruction

Figure 5:
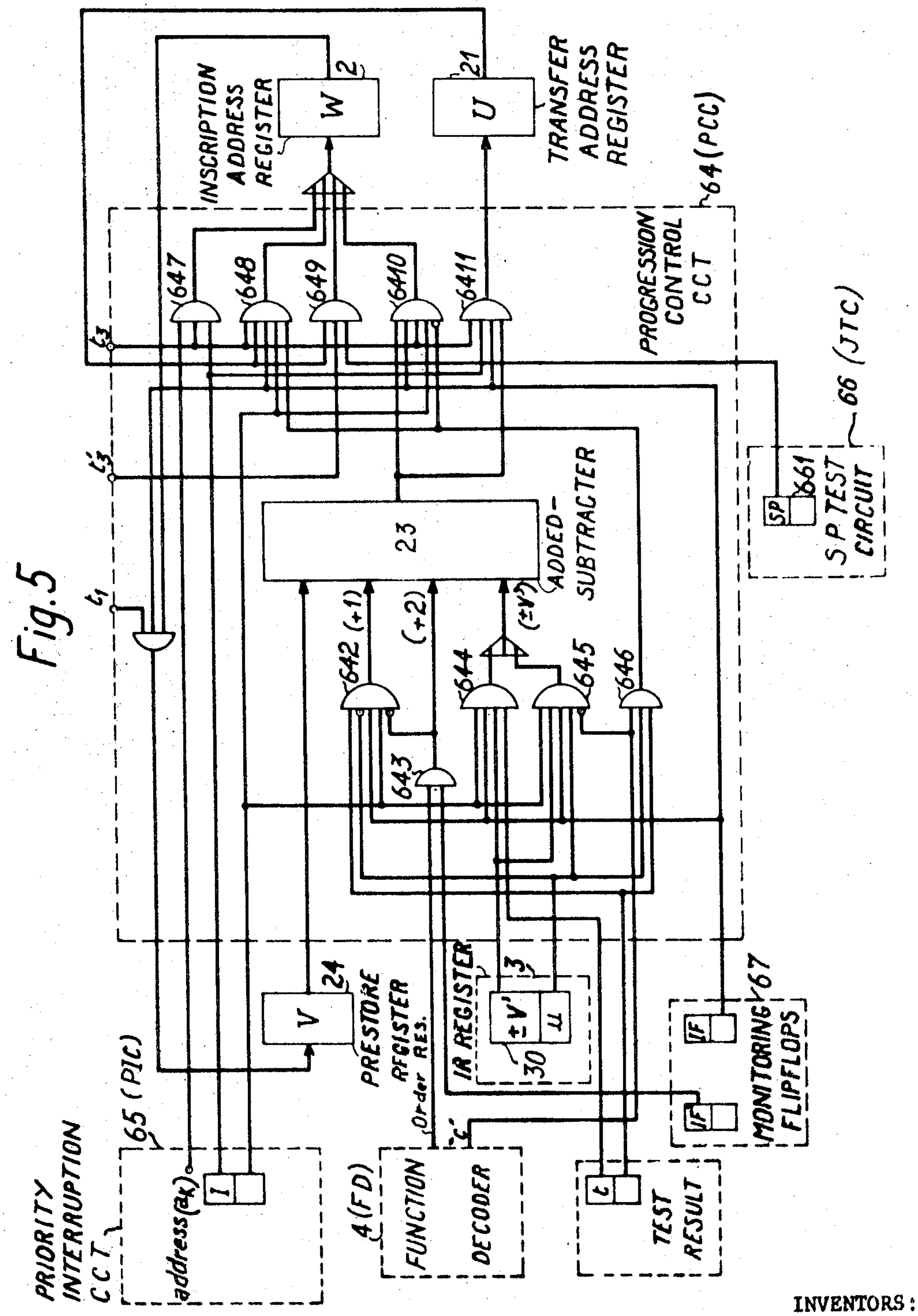
FIG. 5 represents the circuit controlling the progression of the address register of the program permanent store.

The linking of the instructions in the programmed modality consequently complies with the following rules which are established by means of the progression control circuit 64 of FIG. 5.

a. add +1 to the prevailing address contained in 2 if $u$=0 and if there is no positive test, b. add the increment $\pm v'$, being the value contained in address increment register 30, to the prevailing address contained in 2 if the instruction does not comprise a conditional order (which is ascertained at the output point of the function decoder 4) and if $u$=1, or else if, the instruction containing a conditional order, the result of the test is positive, c. replace the content of 2 (prevailing address) by the content of 21 (transfer address) if, the instruction being conditional, the test has been negative or if $u$=1.

All the preceding conditions are evidently invalid unless the first (programmed) modality is in operation, that is to say unless the monitor flip-flop IF corresponds to the zero state.

These two methods of elaborating the future address from the prevailing address and possibly from the result of a test were already disclosed in the calculator of U.S. Pat. application Ser. No. 650,939 in quite similar conditions. This linkage is a little more complicated in this case.

III,3=Mechanism of the instruction address progression (in the first modality)

The shared time base of the computer supplies four periodic base times: $t_0$, $t_1$, $t_2$ and $t_3$.

The period $t_0$ is allocated for the reading out of the instruction (whose address had previously been elaborated in the instruction address register 2) in the program permanent store 1 and for its insertion into the instruction register 3, being the LMP operation.

The periods $t_1$, $t_2$ and $t_3$ are allocated for successively implementing the orders $0_1$, $0_2$, $0_3$ contained in the instruction and decoded in sequence by the function decoder 4.

The transfer of the contents of the address register 2 into the prestore register 24 (operation TWV), for the purpose of preparing the operations of address progression of the period $t_3$ is performed systematically during the period $t_1$ (if the first modality is in operation, that is to say if the monitor flip-flop IF=0).

The period $t_3$ is allocated more specifically moreover for elaboration of the address of the next instruction according to the principles specified in paragraph III,2 (operation TaW). The priority of overriding interruption demands are equally analyzed during this period (see paragraph VIII,3, in the following).

The progression control circuit (PCC) 64 (FIG. 5) receives the following data:

—state of the monitor flip-flop IF (information IF)

—state of the bit $u$ in the instruction register 3 (information $u$),

—presence of an order of conditional type in the instruction register 3 (information C elaborated after decoding of some bits of the order $0_1$, by the function decoder 4), —positive result of a test (information $t$ corresponding to the state of a test flip-flop $t$), —priority interruption demand in progress (information I supplied by the priority interruption circuit (PIC) 65, paragraph VIII,2).

The progression control circuit 64 (PCC) combines these according to the following equations and consequently opens the gates for transfer of the future address into 2 during the period $t_3$:

$\bar{I} . \overline{IF} . \bar{t} . \bar{u}$—opening of the gate 642 and transfer into 2 of the contents of 24 increased by 1, $\bar{I} . \overline{IF} . (t+u . \bar{c})$—opening of the gates 644 and 645 and transfer into 2 of the contents of 24 increased by $v'$, $\bar{I} . \overline{IF} . \bar{t} . u . c$—opening of the gate 648 and transfer into 2 of the contents of 21.

Figure 3:
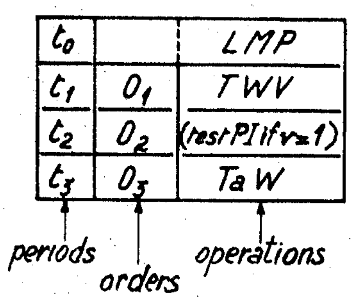

The diagram of the elementary operations of an instruction is given in FIG. 3. Order LMP is a transfer from 1 (PPS) to 3 (IR); order TWV is a transfer from 64 (PCC) to 2 (W) and order TaW is a transfer from 64 (PCC) to 21 (U).

IV—MAKE-UP OF THE FUNDAMENTAL INSTRUCTIONS $IF_0$, $IF_1$, RD

The fundamental instructions ensure that two series of relatively independent elementary operations are performed in parallel (see FIG. 4).

The first series consists in the successive examination of the register-words of the multiregister 5, followed by operations such as directing the junctor scanner 26 to the address readout and the different tests as well as the eventual progression of the multiregister address register 14. The second series consists in preparing the address for transfer to a possible phase subprogram. This preparation is performed systematically as soon as the result of the reading out of the register-word is known but is not actually exploited unless the tests performed during the first series of operations have demonstrated the need to undertake a phase subprogram.

The fundamental instructions exploit the same base periods $t_o$, $t_1$, $t_2$, $t_3$ as the instructions of the first modality of operation. Nevertheless, since the fundamental instructions comprise a function which may be long duration, being the scanning operation (EXP) of the junctor scanner, two base cycles are allocated to the fundamental instructions that is to say a sequence: $t_o, t_1, t_2, t_3, t_0', t_1', t_2', t_3'$.

The fundamental instructions exploit elementary functions of the same nature as those which are specified in the subprogram instructions. Consequently, the order for operation of the functions established in the fundamental instructions can be connected in parallel to the corresponding terminals of the function decoder 4.

IV,1—Make-up of the fundamental instruction $IF_0$

Figure 4A:
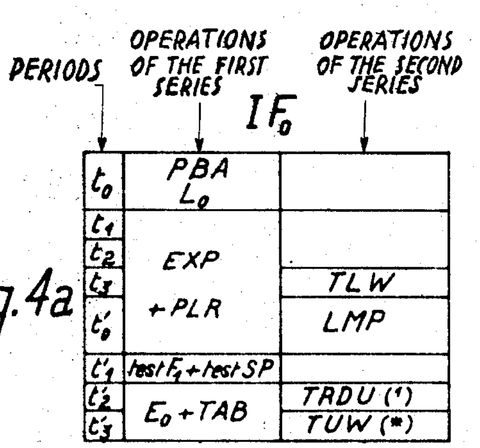

The operations of the fundamental instruction $IF_0$ are given by the list below, whereas FIG. 4*a* shows how these operations are distributed between the eight base periods of the fundamental instruction.

a. Register-word

The multiregister 5 is formed by register-word having 32 bits.

The first subword of the register-word of the recorder (32 bits) consists of:

—8 bits relating to the rapid phase $\Phi_o$ of the register-word (it will be grasped that the second subword of the register-word comprises 8 bits relating to another rapid phase)

—16 bits relating to the address $A_o$ of a junctor among the junctors scanned by the scanner (commonly a terminal of the junctor at the caller's end)

—7 bits representing a "countdown" $\theta_o$ of the number of scans already performed over this register-word in the same rapid phase —1 bit characterizing the prior state $E_o'$, of the junctor terminal examined by the scanner 26, during the preceding scan.

b. Functions allowing of rapid examination of a register-word:

PBA Progression of the multiregister address register: the address of the preceding register-word contained in the auxiliary address register 15 is transferred into the principal address register 14 through the +1 adder unit 27.

$L_0$ Activation of the multiregister 5 and reading out of the first subword of the register-word whose address is supplied by the contents of 14. The subword readout is entered into the readout register 6 (L).

EXP Activation of the junctor scanner, its address being taken in the readout register 6; the result of the state test of the junctor terminal applied to the flip-flop E, 39. It is recalled that E becomes operative when the junctor which is being tested by means of the scanner 26 receives a signal from the caller's line or the incoming circuit to which the junctor is connected.

PLR Modification of the first subword of the register-word prior to rewriting the same in the multiregister. Transfer from the readout register 6 to the write-in register 7, the quantity $\theta_o$ being reduced by one and the quantity $E_o$ being the new value extracted from 39.

$E_0$ Activation of the multiregister 5 and rewriting-in of the subword contained in the register 7 in the register-word whose address is always provided by the contents of 14.

TAB Transfer of the contents of the address register 14 to the auxiliary address register 15 to prepare the progression PBA which will contingently be performed by the following fundamental instruction.

c. Functions which render it possible to test the conditions encountered:

Test F1—Particular bits of the phase $\Phi_o$ contained in 6 are read out, and if they indicate the need to perform a second rapid program on the same register-word, the monitor flip-flop IFA is operated.

Test SP—Test for the need to undertake a phase subprogram. It is accepted that it is appropriate to jump to a phase subprogram (return to the first modality of operation) if the test by the scanner 26 has shown a variation between the existing state (flip-flop E) and the prior state ($E_o$ in the register 6) of the point tested (condition D with $D=E.\bar{E}_o+\bar{E}.E_o$), or else if the time-lagging countdown $\theta_o$ has reached nought. In these conditions, a flip-flop SP is placed in operation according to the equation:

$$SP=IF.\overline{IFB}.(t_1').(E.\bar{E}_o+\bar{E}.E_o+r)$$

in which $r$ denotes the substraction residue produced during the operation PLR.

d. Functions allowing of preparation for jumping to a phase subprogram:

TLW Transfer of the phase $\Phi_o$ registered in 6 into the instruction address register 2.

LMP Activation of the program permanent store 1, reading out of the instruction whose address is given by the contents of 2 and insertion of the readout instruction into 3. This operation performs the reading out of the "table of phases" which is the collection of the address for jumping to the different phase subprograms.

TRDU Transfer of half of the contents of the instruction register 3 into the transfer address 21. This applies to the left-hand or right-hand half according to the test by the scanner giving an indication or not of a variation between the existing state (flip-flop E) and the prior state (bit $E_o$ in register 6) of the point tested (condition D).

TUW Transfer of the address for jumping to the appropriate subprogram from the transfer address register 21 to the instruction address register 2 of the program permanent store. This last operation is not performed unless the "SP test" is positive. In this case, the flip-flop $IF_0$ (which is in the one state during operation according to the second modality) is simultaneously returned to the zero state which, at the next period $t_o$, will render it possible to place IF in the zero state, being the state characterizing the programmed sequences (operation according to the first modality) and to extract the initial instruction from the phase subprogram at the next period $t_o$.

IV,2—Make-up of the fundamental instruction $IF_1$

Figure 4B:
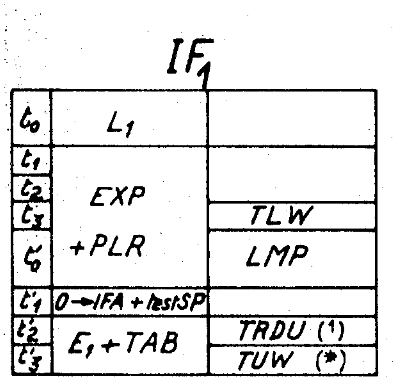

FIG. 4*b* shows that the fundamental instruction $IF_1$ is very similar to $IF_o$, differing from the latter by the following points:

a. The operations $L_0$ and $E_0$ are replaced by $L_1$ and $E_1$: reading out and writing-in of the second subword of the register-word whose address is provided by the contents of 14. The word readout is entered into 6; it comprises data analogous to those of the first subword (see paragraph IV, 1*a*) but relates to another test point.

b. The operation PBA does not occur, since $IF_1$ always being performed after $IF_o$ on the same register-word, there is no occasion to cause progression of the address of the register-word.

c. The testing operation $F_1$ is replaced by a systematic zero reset of the monitoring flip-flop IFA, since $IF_1$ is always followed by $IF_0$ (for the following register-word).

IV,3—Make-up of the fundamental instruction RD

Figure 4C:
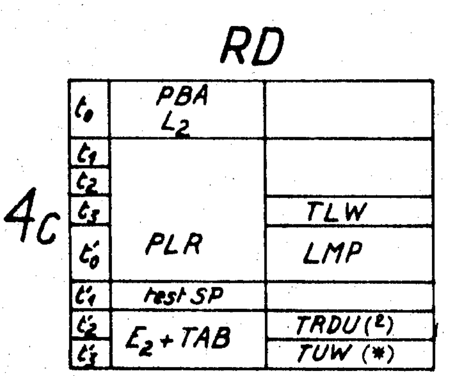

FIG. 4*c* shows the corresponding diagram; it differs from $IF_o$ by:

a. The replacement of $L_o$ and $E_0$ by $L_2$ and $E_2$, reading out and writing-in of the third subword of the register-word containing the slow phase and a time-lagging countdown.

b. The suppression of the EXP operation and the $F_1$ test.

c. The simplification of the SP test which is then limited to determining whether the bits characterizing the value of the slow phase are all equal to zero or not, since the RD instruction always performs a slow phase subprogram except if the register-word is blank.

d. In the TRDU transfer, the half-content of 3 transferred to 2 is not chosen by the "condition D" but according to the value of the higher weight bit of the slow phase contained in readout register 6.

IV,4—Application of a structure common to the stored instructions and to the fundamental nonstored instructions.

This feature of the invention is demonstrated by comparison of the FIGS. 2 and 4*a*, 4*b*, 4*c*:

—The periods $t_o$, $t_1$, $t_2$, $t_3$ employed, are the same.

—The LMP operation is always performed during $t_0$ (or $t_o'$) and the program permanent store 1 is employed in the same manner (address register 2, readout register 3).

—The eventual filling of the address register 2 by the address of the following instruction is always performed during $t_3$ (TaW from 24 to 2 or TUW from 21 to 2, as the case may be).

—The TWV operation from 2 to 24 may be performed without difficulty and systematically during every base period $t_1$.

—The different operations shown in FIGS. 4a, 4b, 4c are orders of the code of programmed instructions of the computer which may be employed as orders $0_1$, $0_2$, $0_3$ in the diagram of FIG. 3.

Moreover, the period $t_3$ (or $t_3'$) is always employed to perform the test of an eventual priority interruption (see paragraphs VIII,3 and VIII,4 in the following).

V—INTERLINKAGE BETWEEN THE FUNDAMENTAL INSTRUCTIONS

As previously stated, if the operation occurs according to the nonstored instruction modality, the monitoring flip-flop IF is in operation, and one of the three fundamental instructions $IF_0$, $IF_1$ or RD is characterized according to the state of IFA and IFB.

If, at the end of a fundamental instruction, the second modality remains in operation, neither the flip-flop IF nor the flip-flop IFB will undergo a change (since RD is reached only by starting with the programmed modality and issue from RD can occur only through a slow phase subprogram).

The flip-flop IFA alone changes its state; transition occurs from $IF_0$ to $IF_1$ the "test $F_1$" function yields a positive result and transition occurs systematically from $IF_1$ to $IF_0$.

Accordingly, the only possible sequence of the second modality are of the type:

----$IF_0$–$IF_0$------ characterized by IF=1, IFA=0, IFB=0 or ----$IF_0$–$IF_1$–$IF_0$--- characterized by IF=1, IFB=0 and IFA=0, 1, 0, 1 or ---RD–RD------ characterized by IF=1, IFA=0, IFB=1

Since the flip-flop IF alone characterizes the operation according to the nonstored instruction modality, the flip-flop IFA and IFB may be employed, on the one hand in the second modality to characterize the fundamental instructions effectively, and on the other hand, during the first modality, as memory flip-flops to establish to which fundamental instruction it is apt to revert during transition from the first modality to the second. The application of this observation in the case of interruption subprograms (return to the interrupted fundamental instruction, paragraph IX,5) will become apparent hereinafter.

VI—TRANSITION BETWEEN THE SECOND MODALITY AND THE FIRST MODALITY

The fundamental instructions normally cause reversion to the instructions of the programmed instruction modality if they result in performing a phase subprogram.

It has been grasped that this was caused by the result of the "test SP" function which, for the instructions $IF_0$ and $IF_1$, test the "condition D" (divergence between the existing state and the prior state of the point tested) and the condition "time-lagging countdown having reached nought" (that is to say the presence of a substraction residue in the PLR function). For the instruction RD, the "SP test" if limited to detecting that the content of the slow phase in the register 6 is not nought, which shows that the register-word in question is occupied.

These different conditions are tested by means of the circuit 66 (JTC) of FIG. 1 during the period $t_1'$ and they place the flip-flop 661 (SP) in state one. If the flip-flop 661 has been operated, the transfer TUW from 21 to 2 will occur during the next period $t_3'$, at the same time as the zero reset of the monitoring flip-flop $IF_0$ (opening of the gate 649 of FIG. 5 and of the gate 6714 of FIG. 6).

As a result, the first modality is in operation from the next period $t_0$; in the program permanent store 1 is thus readout (operation LMP) the register-word whose address had been prepared in 21 (after extraction from the table of phases) and then transferred into the address register 2, that is to say that a jump is performed at the first appropriate instruction of the phase subprogram.

Another transition from the second to first modalities results from the overriding interruption of a fundamental instruction. This case will be studied hereinafter (paragraph VIII,4).

VII—TRANSITION BETWEEN THE FIRST MODALITY AND THE SECOND MODALITY

If the stored-instruction modality is in operation, reversion to the nonstored fundamental instructions can occur in the following cases:

—because examination of a timing mechanism has shown that it was time to start the cyclic analysis of the register-word on the rapid recurrence program ($IF_0$) or on the slow recurrence program (RD);

—because a rapid phase or slow phase subprogram has been completed;

—because an interruption subprogram had been completed and the same had interrupted a fundamental instruction (as will become apparent hereinafter, this last case is characterized by the fact that a flip-flop IF' had been placed in operation at the time of the interruption).

In all these cases, transfer to the fundamental instructions which requires that the monitoring flip-flop IF is placed in operation, results from an instruction including an order in position $0_3$.

VIII— MECHANISM FOR OVERRIDING INTERRUPTION OF THE INSTRUCTIONS AND OF THE FUNDAMENTAL INSTRUCTIONS

The overriding interruption has the purpose of inserting, into the normal development of a program, a sequence of instructions (first modality) rendering it possible to comply rapidly with the call from a peripheral element of the computer. Several calls may come in simultaneously, a priority being determined by optional rules applicable to the different peripheral elements likely to be calling. On the other hand, the sequence of instruction (referred to as interruption subprogram) which is started up by the call, depends on the peripheral element in question, and the transfer address should accordingly be calculated (address of the first instruction of the interruption subprogram) whilst considering the peripheral element securing priority.

These different operations are performed by means of an element entrusted with the overriding interruptions 65 (PIC), as apparent from FIG. 1. It acts at the end of each instruction or of each fundamental instruction but cannot obey a demand for an interruption except in particular conditions.

VIII,1—Conditions of acceptability for an interruption demand

It will become apparent that the overriding interruption disturbs the contents of the register 21.

If it is wished to prevent disturbance of the program in progress, the interruption should not be accepted if this programs employs the register 21.

A programming operator editing the programs of the first modality has the capability of specifying the instructions following which the contents of the register 21 become superfluous to the program in progress. The operator thereupon assigns the value 1 to the bit $v$ in these instructions. These instructions, in which $v$ =1, are referred to as "interruptible," meaning that they may be followed by an interruption subprogram in case a call has been received by the interruption circuit 65 (PIC).

The interruptible nature of the instructions is thus included in the program in the form of orders. It may be detected by testing the bit $v$ in the instruction register 3.

In respect of the fundamental instructions, the transfer address register 21 is employed to elaborate the address for transfer to the phase subprogram (function TRDU during $t_2'$, then contingently TUW during $t_3'$). It may not be disturbed during the period $t_3'$ unless the function TUW is not in use, that is to say unless the fundamental instruction does not effect a transfer to a phase subprogram, or else as became apparent, unless the flip-flop 661 has not been placed in operation by the test function SP.

To summarize, the condition for acceptance of the possible interruption demand by the priority interruption circuit 65 is that, if the first modality is in operation, the bit $v$ should be equal to 1, and if the second modality is in operation, that the flip-flop SP should be inoperative.

VIII,2—Choice of the peripheral element for precedence

The priority interruption circuit 65 (PIC) comprises a precedence circuit wired in such manner that a single peripheral element is picked if several of these transmit a call at the same time.

Priority circuits wired in this manner are known.

The priority check (PI) being made during the period $t_2$ (or $t_2'$) (see FIG. 3), it results in actuating a flip-flop $650_k$ (FIG. 6) only, among a set of $n$ of these. This flip-flop $650_k$ then characterizes the peripheral element of rank $k$ picked among the $n$ elements. By this very fact, is determines the transfer address ($a_k$), the address of the first instruction of the interruption subprogram. If one of the flip-flops $650_k$ comes into operation, it characterizes the interruption call and prohibits any subsequent change in the selection made by the priority interruption circuit 65.

VIII,3—Operations for interruption during the period $t_3$ of an instruction

Circuit 65 (PIC) triggers the operations of interruption if the following conditions are fulfilled:

—operation according to the first modality (IF=0)

—interruptibility bit $v$=1 which open the gate 652 at time $t_2$ and renders 651 operative.

The operations performed during the periods $t_3$ are the following:

—neutralization of the normal operations for instruction address progression. The function TaW of insertion of the future address into 2 is inhibited by closing of the gate numbered 6410 in FIG. 5, —insertion of the future address calculated by the circuit 64 (PCC) into the transfer address register 21 (opening of the gate 6411), —insertion into the register 2 of the transfer address ($a_k$) determined by the circuit 65 (PIC) according to the flip-flop $650_k$ selected (opening of the gate 647).

Accordingly, the result of these operations is that the transfer address ($a_k$) is ready in 2 to direct the reading out of the program permanent store during the next period $t_o$, that is to say to provide the first instruction of the interruption subprogram.

At the same time however, the address of the instruction which would have been performed if there had not been any interruption, is prestored into 21 from which it may be reextracted at the end of the interruption subprogram to jump to the precise point of interruption of the program. This return jump will thus be performed by means of normal programmed operations (paragraph IX,4).

VIII,4—Operations for interruption of a fundamental instruction during the period $t_3'$ Circuit 65 (PIC) triggers the operations of interruption if the following conditions are fulfilled: fulfilled:

—operation according to the second modality (IF=1)

—flip-flop 661 inoperative (the fundamental instruction does not cause transition to the first modality)

—the interruption flip-flop 651 1 is in operation.

Figure 6:
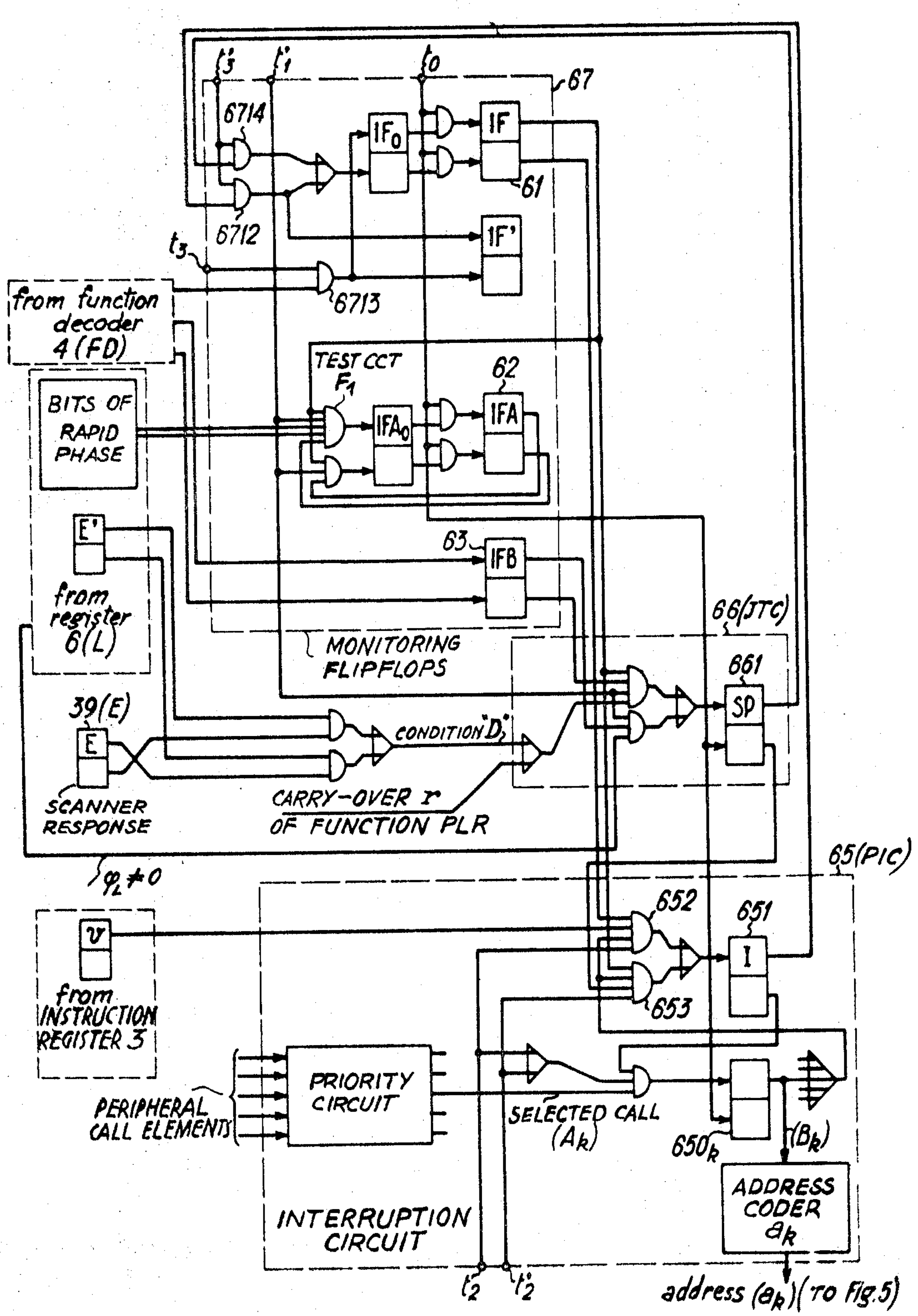
FIG. 6 represents the monitoring flip-flops controlling the fundamental nonstored instructions.

These operations are the following:

at the time $t_3'$:

—deactivation of the monitoring flip-flop $IF_0$ through the gate 6712 of FIG. 6, then of IF during the next period $t_o$;

—activation of the memory flip-flop IF′ through the same gate 6712;

at the time $t_3$:

—insertion into the register 2 of the transfer address ($a_k$) determined by the circuit 65 (PIC) according to the flip-flop $650_k$ chosen, through the open gate 647 (FIG. 5).

IX—MAKE-UP OF THE INTERRUPTION SUBPROGRAM

The provisional "parking" or prestoring of all the data situated in the registers of the computer must be performed so that the program in progress is not disturbed by the interruption but only delayed.

A general method will be described, which renders it possible, by means of two special instructions only, to shift the readout register 6 and the write-in register 7 into the multiregister 5, and the address register 14 into the auxiliary register 14′. BY symmetry, two other instructions situated at the end of the interruption subprogram render it possible to restore the previous conditions, that is to saY to shift the initial contents of registers 6 and 7 from the multiregister 5 into the said registers and the contents of the auxiliary register 14′ into the register 14.

IX,1—Setting instruction (SET) (or first interruption instruction)

This instruction, the first of the interruption subprogram, is situated at the address ($a_k$). Apart from the function "SET" arranged as the first order $0_1$ (see FIG. 2*d*) but decoded during the three active periods, it comprises two parameters $i$ and $\alpha$ which define a register-word address, as will become apparent. The bits $u$ and $v$ are equal to nought. It performs the totality of the following elementary operations decoded by means of the function decoder 4:

a. during the period $t_1$:

—transfer TAA′ of the contents of the address register 14 of the multiregister 5 into its auxiliary parking register 14′ (the register 15 is not disturbed);

—transfer TWV which results in placing the address $a_k$ into the prestore register 24;

b. during the period $t_2$:

—transfer into the register 14 of the multiregister address $\alpha$ contained in the instruction register 3 (operation TRDA);

c. during the period $t_3$:

—operation $E_i$: writing in the multiregister, in the register-word whose address $\alpha$ is supplied by the contents of 14 and in the subword having the rank $i$ at this address, the information thus written-in being the contents of the write-in register 7; this amounts to parking the contents of 7 in the register-word defined by the address ($\alpha$, $i$).

—operation for progression of the instruction address (TaW) which, in this case, is a progression by one unit: i.e. the insertion of the address ($a_k$+1) into 2, since the condition: $\overline{I}\,.\,\overline{IF}\,.\,\overline{t}\,.\,\overline{u}$ is established in the circuit 64 (PCC) (see paragraph III,3, gates 642 and 6410 open, FIG. 5).

During the following period $t_o$, the instruction of address ($a_k$ +1) is thus extracted from the multiregister 5.

IX,2—Second instruction of interruption

Figure 2A:
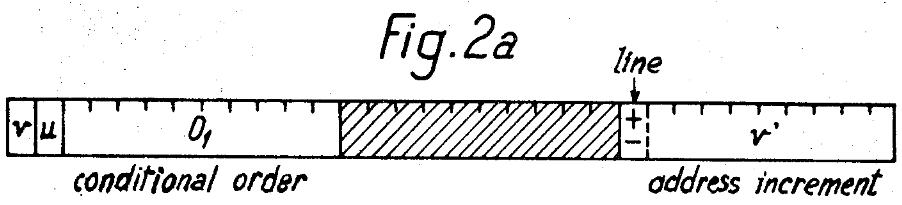
Figure 2B:
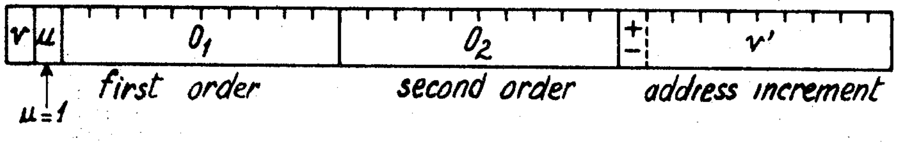
Figure 2C:
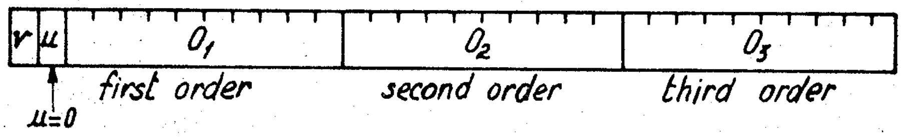

This instruction, situated at the address ($a_k$+1), is a normal instruction having three nonconditional orders (FIG. 2*c*). The binary terms $u$ and $v$ are equal to nought.

It performs the following operations:

a. during the period $t_1$:

—transfer from 6 to 7, operation TLR.

—transfer TWV (resulting in placing the address ($a_k$+1) into 24).

b. during the period $t_2$:

—writing-in operation $E_{i+1}$: writing in the multiregister, in the register-word whose address is provided by the contents of 14 (still equal to $\alpha$) and in the subword having the rank ($i$+1) of this address. The information thus transferred being taken into 7, whose contents reproduce those of 6 following the order TLR, this amounts to parking the contents of 6 in the register-word having the address ($\alpha$, $i$+1).

—operation of instruction address progression TaW which, as previously, is the insertion into 2 of the value ($a_k$+2).

After performing these two instructions, 7 has thus been parked at the address ($\alpha$, $i$) of the multiregister, 6 at the adjacent address ($\alpha$, $i$+1), and the register 14 in its auxiliary parking register 14'. It is pointed out that the register 21 contains the address $a$ of the instruction which has not been performed, or else that the memory flip-flop IF' is in operation according to whether the first or second modality operation has been interrupted.

The interruption subprogram can thus employ all the registers of the computer, except for 21 and 14' without other restrictions.

IX,3—Resumption instruction (RES) (penultimate interruption instruction)

The instruction (RES) whose address in the program permanent store is for example $b$ (the contents of 2 thus being equal to $b$), is reached at the end of the interruption subprogram.

Figure 2D:
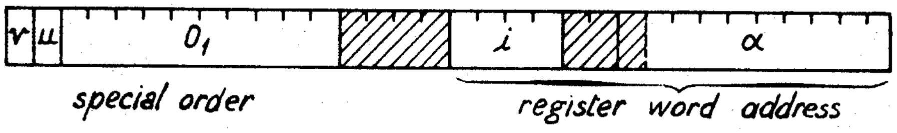

Apart from the function code (RES) positioned as a first order $0_1$, the resumption instruction comprises the same parameters $i$ and $\alpha$ as the setting instruction (SET) (FIG. 2*d*).

It performs the totality of the following operations, which is decoded by the function decoder 4:

a. during the period $t_1$:

—transfer into the address register 14 of the multiregister 5 of the address $\alpha$ contained in the instruction register 3 (operation TRDA).

—transfer TWV (places the instruction address in 24).

b. during the period $t_2$:

—operation $L_i$, reading out of the register-word of the multiregister 5 having the address $\alpha$ provided by the address register 14 and in this word of the subword having the rank $i$ of this address.

The information readout is placed in the register 6.

c. during the period $t_3$:

—transfer TLR of the contents of register 6 to the register 7

—particular address progression TaW.

Two cases are possible:

—if the memory flip-flop IF' is inoperative, this address progression is a normal progression by one unit, that is to say that the value ($b$+1) is entered into 2 through the gates 642 and 6410 of FIG. 5 which are both open.

—if the flip-flop IF' is operative, this address progression amounts to two units, that is to say that the value ($b$+2) is entered into 2 through the gates 643 and 6410 of FIG. 5 which are both open.

Accordingly, after the resumption instruction (RES), the initial contents of 7 have been taken from the parking address ($\alpha$, $i$) of the multiregister. Moreover, progression occurs to a final interruption instruction which is situated at the address ($b$+1 or at the address ($b$+2) depending on whether the overriding interruption occurred when the first modality or the second modality was in operation, that is to say depending on whether a return is to occur to a delayed stored instruction or to a fundamental nonstored instruction.

IX,4—Final interruption instruction (case of return to the instructions of the first modality)

This instruction is situated at the address ($b$+1), being a normal instruction having three nonconditional instructions (FIG. 2*c*). It performs the following operations:

a. during the period $t_1$:

—operation $L_{i+1}$: reading out of the multiregister at the address provided by the register 14 and at the word having the rank ($i$+1) of this address. The information readout, which is the initial content of 6 parked at the address ($\alpha$, $i$+1) of the multiregister, is thus reestablished in 6.

—transfer TWV (unnecessary in this case).

b. during the period $t_2$:

—transfer into the register 14 of its initial contents parked in 14' (TA'A).

c. during the period $t_3$:

—operation TUW for transfer of the contents of 21, that is to say (paragraph VIII,3) of the address $a$ of the instruction which had not been carried out, into 2 by opening the gate 648 of FIG. 5.

The result is that the initial program is resumed after the initial contents have been reestablished in the registers 6, 7 and 14.

IX,5–Final interruption instruction (case of return to the fundamental instructions)

This instruction is situated at the address ($b$+2), being a normal instruction having three unconditional orders (FIG. 2*c*). It performs the following operations:

a. during the period $t_1$:

—operation $L_{i+1}$, as in paragraph IX,4

—transfer TWV (unnecessary in this case)

b. during the period $t_2$:

—transfer from 14' into 14 as hereinbefore (TA'A)

c. during the period $t_3$:

—operation RIF (return to fundamental instructions) consisting of actuating the flip-flop $IF_0$ and deactivating the flip-flop IF' by opening of the gate 6713 in FIG. 6

—the normal progression of the instruction address may be performed as customary, but will not be applied owing to the activation of the monitoring flip-flop $IF_0$.

Consequently, following this instruction, the operation according to the second modality has been reestablished (monitoring flip-flop IF in operation) but in addition, since the other two monitoring flip-flops IFA and IFB have not been disturbed since the interruption, the fundamental instruction which will be carried out is definitely that which had been expected at the instant in which the overriding interruption intervened ($IF_0$ or $IF_1$ or RD).

IX,6—So that the resumption of the interrupted program may occur normally, it is necessary that the parking registers 21, 14' and the words of addresses ($\alpha$, $i$) and ($\alpha$, $i$+1) are not disturbed, and it is not permissible for the instructions of the interruption subprogram themselves to be exposed to interruption (since this would cause the destruction of the parked data). According to the invention, this is accomplished simply by allocating the value O to the bit $v$ of all these instructions which thus become "noninterruptible" (see paragraph VIII,1).

IX,7—The operations for overriding interruption of a sequence of instructions or of fundamental instructions according to the invention, are of particularly simple nature. This is accomplished thanks to an important feature of the structure described, which consists in the fact that the totality of the elementary operations contained within a cycle of four periods $t_0$, $t_1$, $t_2$, $t_3$ for one instruction, or in two cycles for a fundamental instruction, represents an "entirety" (which may be considered as a "macroinstruction"). Accordingly, it is quite permissible to choose the connection between two of these "macroinstructions" as a point of interruption for insertion of an interruption subprogram.

X—TIME BASE CIRCUITS

The general time base of the computer should provide four periods $t_0$, $t_1$, $t_2$, $t_3$ for performing the instructions and eight periods $t_0$, $t_1$, $t_2$, $t_3$, $t_0'$, $t_1'$, $t_2'$, $t_3'$ for performing the fundamental instructions.

It comprises an oscillator providing the four reference periods $\theta_0$, $\theta_1$, $\theta_2$, $\theta_3$ followed by a distributor which, whilst making allowance for the state of the monitoring flip-flops, generate the required elementary periods.

So that the state of the monitoring flip-flops may be clearly defined during all periods, these are actually formed as apparent from FIG. 6, by two coordinated flip-flops $IF_0$ and IF on the one hand, and $IFA_0$ and IFA on the other hand.

The change in the state of the principal flip-flops IF and IFA occurs only during the period $\theta_0$, so that these may characterized all the base periods without ambiguity, except for $t_0$. By contrast, the flip-flops cannot change in state except outside this period. Being stable during $\theta_0$, these latter flip-flops $IF_0$ and $IFA_0$ are those defining the period $t_0$.

The equations governing the monitoring flip-flops are the following (FIG. 6):

$IF_0$ -------- { Setting at 1=code "RIF" decoded by the function decoder 4 (during $t_3$ as a rule). Setting at $0=t_3'$. $(I+SP)$ (transition to the first modality).

$IF$ -------- { Setting at $1=IF_0.t_0$. Setting at $0=\overline{IF_0}.t_0$.

$IFA_0$ ------ {Setting at $1 = t_1'.IF.\overline{IFA}.L_n.L_{n-1}$ ($L_n$, $L_{n-1}$ =bits of higher weight of the phase). Setting at $0 = t_1'.IF.IFA$.

IFA ------- {Setting at $1 = IFA_0.t_0$. Setting at $0 = \overline{IFA_0}.t_0$.

Figure 7:
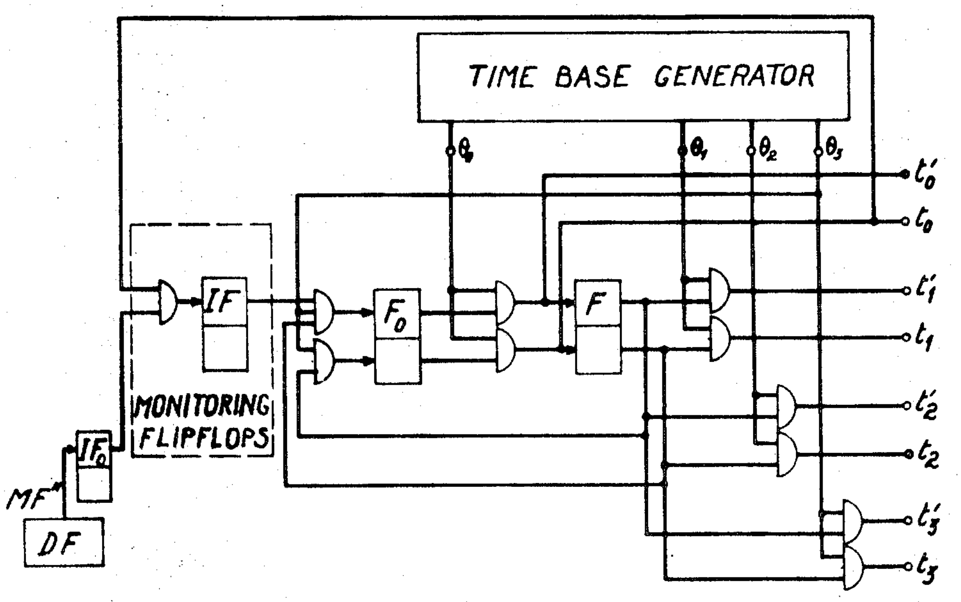
FIG. 7 represents the time-base of the computer.
Figure 8:
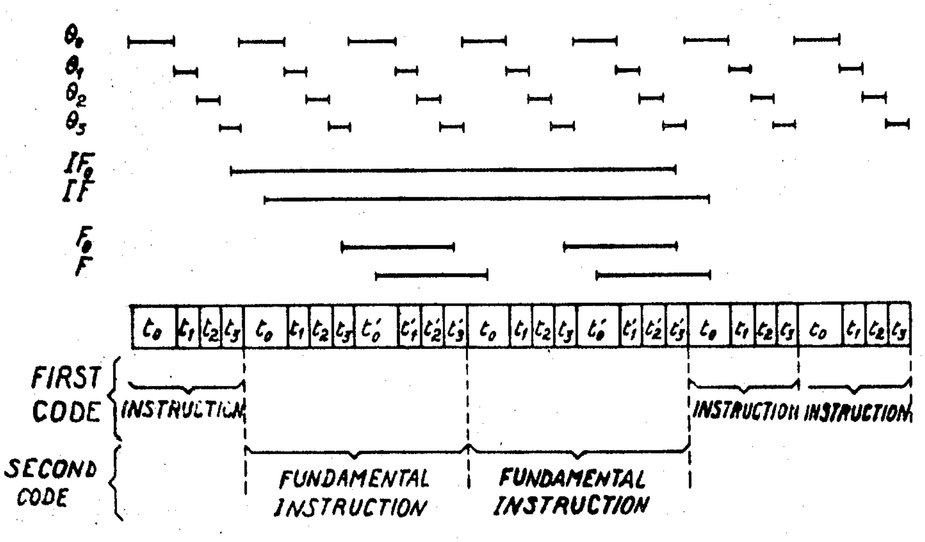
FIG. 8 represents the time slots for implementing the orders of the ordinary instructions and the orders of the fundamental instructions.

To separate the periods $t_0'$, $t_1'$, $t_2'$, $t_3'$ from the periods $t_0$, $t_1$, $t_2$, $t_3$, two complementary flipflops $F_0$ and $F$ are needed (Fig. 7):

$F_0$ --------- {Setting to $1 = IF.\overline{F}.\theta_3 (= IF.t_3)$. Setting to $0 = IF.F.\theta_3 (= IF.t_3')$.

F --------- {Setting to $1 = F_0.\theta_0 (= t_0')$. Setting to $0 = F_0.\theta_0 (= t_0)$.

The base periods are then determined in the following manner from the periods $\theta_0\,\theta_1\,\theta_2\,\theta_3$ of the oscillator:

$t_0 = \theta_0.\overline{F}_0$: $t_1 = \theta_1.\overline{F}$; $t_2 = \theta_2.\overline{F}$: $t_3 = \theta_3.F$ $t_0' = \theta_0.F_0$: $t_1' = \theta_1.F$: $t_2' = \theta_2.F$: $t_3' = \theta_3.F$

XI—DETAILED STRUCTURE OF THE FUNDAMENTAL INSTRUCTIONS

FIG. 4 shows the diagram of the elementary operations performed during the fundamental instructions. In FIG. 1, the gates for data transfer which are opened during these different operations (specified in chapter IV) are illustrated symbolically by small circles together with the initials of the specific operation.

Figure 9:
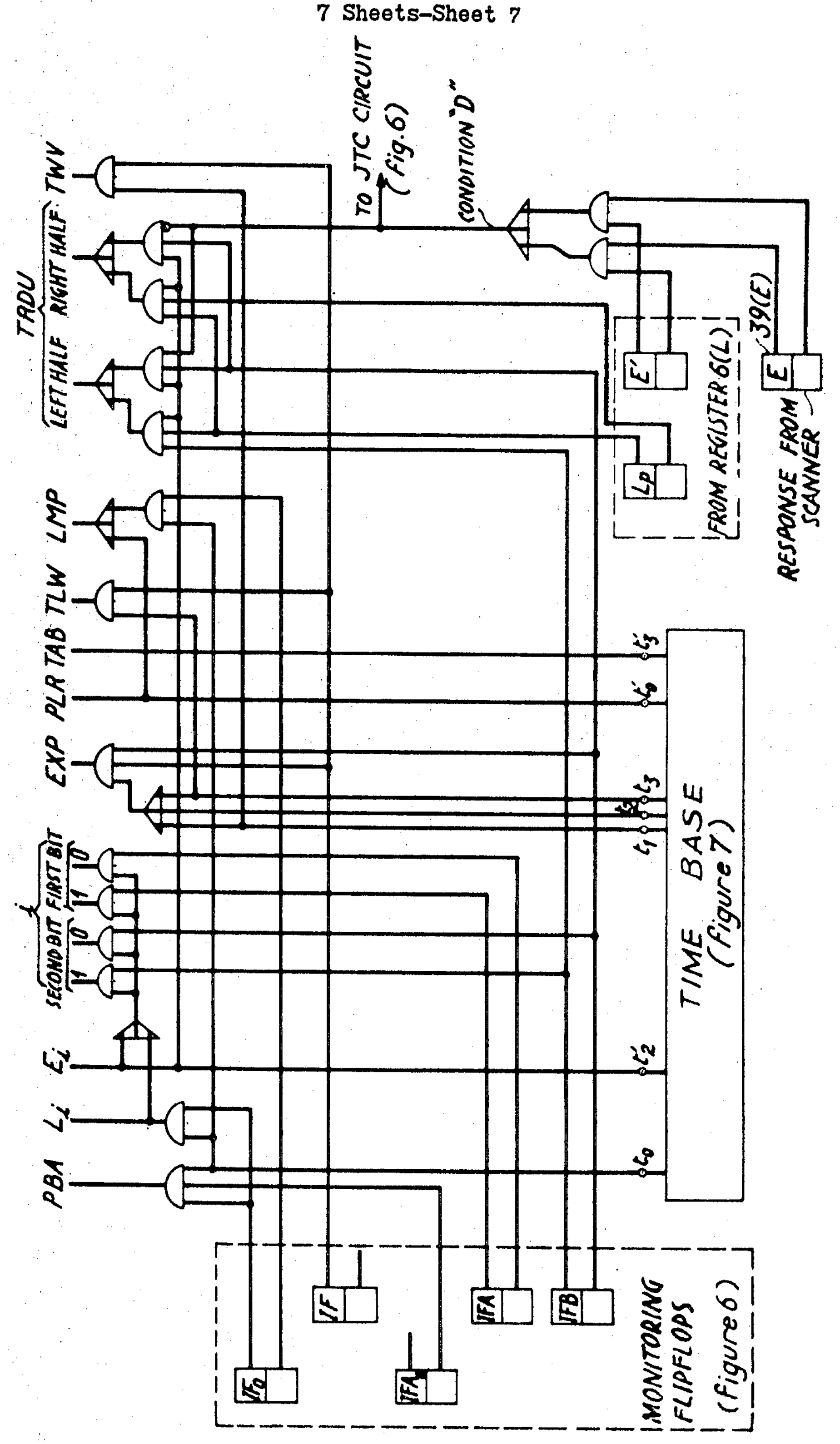
FIG. 9 represents the logical generation of the orders of the fundamental instructions.

The logical equations corresponding to the opening of these gates are summarized hereinafter (FIG. 9):

| Elementary function | | Condition of realisation in the fundamental instructions | |
|---|---|---|---|
| | PBA | $t_0.IF_0.\overline{IFA_0}$ | |
| $L_i$ | $L_0$ | $t_0.IF_0.\overline{IFA}.\overline{IFB}$ | (1) |
| | $L_1$ | $t_0.IF_0.IFA.\overline{IFB}$ | (1) |
| | $L_2$ | $t_0.IF_0.IFB$ | (1) |
| | EXP | $(t_1+t_2+t_3)\ IF.\overline{IFB}$ | |
| | PLR | $t_0'$ | |
| $E_i$ | $E_0$ | $t_2'.\overline{IFA}.\overline{IFB}$ | (1) |
| | $E_1$ | $t_2'.IFA.\overline{IFB}$ | (1) |
| | $E_2$ | $t_2'.IFB$ | (1) |
| 3578918 | | | |
| | TAB | $t_3'$ | |
| | TLW | $t_3.IF$ | |
| | LMP | $t_0.\overline{IF}_0+t_0'$ | |
| TRDU | Left-hand half. | $t_2'.\overline{IFB}\,(E.\overline{E}'+\overline{E}.E')+t_2'.IFB.L_P$ | (2) |
| | Right-hand half. | $t_2'.\overline{IFB}.(E.E'+\overline{E}.\overline{E}')+t_2'.IFB.\overline{L}_P$ | (2) |
| TWV | | $t_1.\overline{IF}$ | |
| TRDA | | $t_2$.(code "SET")+$t_1$(code "RES") | |

[1] It will be noted that the first bit ("lightweight") of the address complement (i) is equal to thevalue cf IFA and that the second bit is equal to the value of IFB.

[2] E' is the prior state flipflop (Fig. 6) and $L_P$ the "higher weight" flipflop of the "slow phase," both appertaining to the register 6.

All the codes in the foregoing may moreover appear in standard instruction (FIGS. 2*b* and 2*c*) as orders $0_1$, $0_2$ or $0_3$ and consequently, the corresponding gates may moreover be activated by output signals from the function decoder 4 et the periods $t_1$, $t_2$ or $t_3$ as shown in FIG. 1 by the joint connection of particular output terminals of the decoder 4 with the terminals of the circuit of the monitoring flip-flops.

We claim:

1. A digital computer for controlling telephone switching systems comprising a program permanent store having written therein contingent instructions relative to telephone communication establishment and release processing operations, a readout register, an instructions address register for addressing an instruction to be readout and an auxiliary instruction address register for memorizing the address of an instruction to be readout, said readout, instructions address and auxiliary instruction address registers being associated with said program permanent store, a multiregister, write-in and rewrite-in register means for writing in said multiregister register words containing data relative to the actual state of a telephone communication being processed and for rewriting in said multiregister modified register words, a readout register associated with said multiregister, a group of flip-flops controlling, according to their relative states, repetitive operations consisting in reading out from said readout register the register words, testing the potentials of points located in said switching system, receiving test result signals from said tested points and rewriting in said write-in and rewrite-in register means the register words selectively modified according to said test result signals, first means for jumping from the control of the computer by said group of flip-flops to the control thereof by said program permanent store, said first means comprising means for comparing the result signals of two consecutive potential tests, means for counting the number of consecutive tests with unchanged result signals and means, controlled by both said comparing means and said counting means, for inhibiting said flip-flops, transferring in the instruction address register the address contained in the auxiliary instruction address register and activating the program permanent store, and second means for jumping from the control of the computer by said program permanent store to the control thereof by said group of flip-flops, said second means comprising means for detecting a jump instruction in said instruction register, transferring in the auxiliary instruction address register the address of said jump instruction, inhibiting the program permanent store and activating said group of flip-flops.

2. A digital computer for controlling telephone switching systems comprising a program permanent store having written therein contingent instructions relative to telephone communication establishment and release processing operations, each instruction being composed of a plurality of function orders, an instruction address register for addressing an instruction to be readout, an auxiliary instruction address register for memorizing the address of an instruction to be readout, a readout instruction register and a function decoder associated with said program permanent store, said function decoder being connected to said readout instruction register and delivering order signals on a plurality of output terminals, a multiregister, write-in and rewrite-in register means for writing in said multiregister register words containing data relative to the actual state of a telephone communication being processed and for rewriting in said multiregister modified register words associated with said multiregister, a group of flip-flops controlling, according to their relative states, repetitive operations consisting in reading out from said readout register the register words, testing the potentials of points located in said switching system, receiving test result signals from said tested points and rewriting in said write-in register the register words selectively modified according to said test result signals, and delivering order signals on a plurality of output terminals, the output terminals of the function decoder and the group of flip-flops delivering the same order signals being respectively connected, first means for jumping from the control of the computer by said group of flip-flops to the control thereof by said program permanent store, said first means comprising means for comparing the results of two consecutive potential tests, means for counting the number of consecutive tests with unchanged results and means, controlled by both said comparing means and said counting means, for inhibiting said flip-flops, transferring into the instruction address register the address contained in the auxiliary instruction address register and activating the program permanent store, and second means for jumping from the control of the computer by said program permanent store to the control thereof by said group of flip-flops, said second means comprising means for detecting a jump instruction in said instruction register, transferring into the auxiliary instruction address register the address of said jump instruction, inhibiting the program permanent store and activating said group of flip-flops.

75